United States Patent Office 3,709,816
Patented Jan. 9, 1973

3,709,816
CONTROL OF ALLUVIAL AND OTHER DEPOSITS IN AQUEOUS SYSTEMS
Jerry Lee Walker, Coraopolis, and Jerry Emile Boothe, Pittsburgh, Pa., assignors to Calgon Corporation, Pittsburgh, Pa.
No Drawing. Filed July 1, 1971, Ser. No. 158,986
Int. Cl. C02b 5/06
U.S. Cl. 210—58                                                              6 Claims

ABSTRACT OF THE DISCLOSURE

Polymers of 2-acrylamido methyl propyl sulfonates or sulfonic acid are used to fluidize and disperse insoluble alluvial deposits, such as silt, from water systems.

BACKGROUND OF THE INVENTION

This invention is directed to the problem caused by deposits of silt, alluvium, etc., left by water systems in cooling towers, once-through cooling water systems and the like. Such deposits on the water side of a heat transfer surface greatly retard the transfer of heat not only by limiting the circulation of water but by insulating it from the relatively hot metal surface it is supposed to cool.

Prior to the present invention, several types of polymers have been used to remove silt already deposited. Typically, the polymer such as polyacrylamide (Zimmie, U.S. Pat. 3,085,916) is added to the water in amounts from about 0.05 to 200 p.p.m. and flushed through the system. The polyelectrolyte character of the polymer and its great length combine to pick up the minute, relatively dense, insoluble, particles of silt and the like, forming relatively light, large flocs which are then flushed out of the system by the force of the water. Flock, in U.S. Pat. 3,288,640, uses polyethylene-imine for a similar object. Zierden (U.S. Pat. 3,503,879) employs certain inorganic polymers, particularly potassium metaphosphate, to remove silt from water systems.

Although many comonomers have been used with acrylamide and many modifications of the acrylamide monomer have been created and proposed, no significant commercialization of any such new acrylamide derivative has superseded the acrylamide polymers proposed by Zimmie.

SUMMARY OF THE INVENTION

The essential monomer used in our invention is of the formula

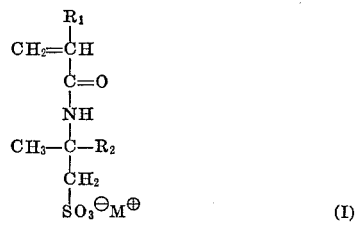

(I)

where $R_1$ is H, alkyl to $C_4$ (linear or branched), phenyl and substituted phenyl, and where $R_2$ is H, phenyl, substituted phenyl, alkyl (linear or branched) or cycloalkyl to $C_{12}$ and where M is H, alkali metal, alkaline metals, zinc or copper, and $N(R_3)_4$ where $R_3$ is H, alkyl (linear or branched), cycloalkyl, benzyl, phenyl and hydroxy alkyl (linear or branched).

Monomers of the above description are formed into polymers by known polymerization methods, such as solution, suspension or emulsion techniques as disclosed in U.S. Pats. 3,547,899, 3,388,199, 3,332,904, and Canadian Pat. 864,433. To be useful in our invention the polymers should have molecular weights of at least 10,000. We may use water-soluble copolymers of the monomers of Formula I having molecular weights of at least 10,000. By "water soluble," we mean the polymer or copolymer must exhibit at least 0.25 percent solubility in water. Any comonomer may be used, so long as the polymer created has the above molecular weight and water solubility characteristics. Among the preferred useful comonomers may be mentioned acrylamide, acrylic acid, vinyl acetate, methyl acrylate and styrene. Monomers of the Formula I should comprise at least 2 mole percent. Other water-soluble monoethylenically unsaturated monomers include acrylic acid, methacrylic acid, the alkali metal, amine and ammonium salts of acrylic and methacrylic acids, methacrylamide, β-aminoethyl acrylate, β-aminoethyl methacrylate, N-methyl-β-aminoethyl acrylate, N-methyl-β-aminoethyl methacrylate, N,N-dimethyl β-aminoethyl methacrylate, and the water-soluble N-alkyl substituted acrylamide and methacrylamides such as N-isopropyl acrylamide. Still other comonomers of the water-soluble class are the alkali metal styrene sulfonates, and alkali metal vinylbenzoates, and diacetone acrylamide. Also useful are allyl alcohol, N-vinyl pyridine, N-vinyl pyrrolidone, and N-vinyl-2-oxazolidone. If desired, water-insoluble monomers can also be copolymerized to provide polymers useful herein. To maintain the necessary water solubility, such copolymers will usually contain no more than about 25 mole percent of the water-insoluble co-monomer. Illustrative of such comonomers are styrene, vinyl chloride, vinylidene chloride methylmethacrylate, and methacrylonitrile.

In a demonstration of our invention, a sludge from a cooling tower was used. It had the following composition:

Major: Aluminum silicate (mullite)
Low major: Silica (quartz, amorphos and diatoms)
Minor: Fly ash
Low minor: Hydrated ferric oxide
Trace: Magnetic iron oxide; aluminum oxide (corundum); ferric oxide; and calcium carbonate (calcite)

This sludge is typical of many silt compositions found in the field.

The demonstration as silt control agents was performed by standard flocculating tests. The sludge concentrate was diluted 1:3 with distilled water and the mixture shaken for uniformity. The sludge mixture was poured into 250 milliliter graduate cylinders, inverted five times, and the time to settle to a pre-determined point was recorded.

Dosages of polymer were then added in 0.02 milligram per liter increments and the time to settle to the control point recorded. The control point with no treatment was reached in 6 to 7 minutes. Each graduate test was put on a uniform basis by multiplying the polymer-induced settling times by the factor: minutes to control point/6.5 minutes.

Table 1 shows the relative effectiveness of the copolymers tested as well as the relative effectiveness of commercial silt-control compositions, hydrolyzed polyacrylamide, and polystyrene sulfonate. The relative effectiveness numbers shown in the table were obtained by adding the polymers in increments until the control point was reached in one minute or less, and then using the time required to reach this point to establish this ratio:

Effectiveness ratio = (1/polymer dosage in mg./l.) × (1/time to control point in sec.) × 100

The term "2-AMPS" means our preferred monomer, 2-acrylamido propane sulfonic acid.

TABLE 1

Relative effectiveness of polymers on actual sludge from a cooling tower

Polymer: Effectiveness ratio
(1) Homopolymer of 2-AMPS _____ 19
(2) 51% 2-AMPS; 49% acrylamide _____ 98
(3) 35% 2-AMPS; 65% acrylamide _____ 56
(4) 25% 2-AMPS; 75% acrylamide _____ 78
(5) 15% 2-AMPS; 85% acrylamide _____ 96
(6) 10% 2-AMPS; 90% acrylamide _____ 97
(7) 5% 2-AMPS; 95% acrylamide _____ 89
(8) 2.5% 2-AMPS; 97.5% acrylamide _____ 78
(9) Homopolymer of acrylamide _____ 37

Laboratory tests on a homopolymer of Formula I showed the following when evaluated using a "silt control" screening test wherein the settling time in equal samples is observed at different concentrations. A sludge sample from the same cooling tower was used in the evaluation.

| Sample | Quantity, p.p.m. | Settling time, minutes |
| --- | --- | --- |
| 1. Control | | 10 |
| 2. Poly(potassium metaphosphate) | 12 | 8 |
| 3. Poly dimethyl diallyl ammonium chloride | 4 | 6 |
| 4. Hydrolyzed polyacrylamide | 0.4 | 4 |
| 5. Polymer 2-AMPS | 0.4 | 3 |

The polymer type used in this test was a homopolymer of 2-acrylamido propane sulfonic acid.

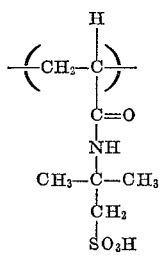

In the following additional settling tests, the polymers tested had compositions as shown below:

(A) Polyacryamide, about 5% hydrolyzed (ZIMMITE)
(B) 35% hydrolyzed high molecular weight polyacrylamide
(C) Polyethylene-imine, about 20% solution (CL 45)
(D) Poly(dimethyl diallyl ammonium chloride) (CL 85)
(E) Acrylamide/2-AMPS copolymer in a molar ratio of 49/51
(F) Acrylic acid/2-AMPS copolymer in a molar ratio of about 25/75
(G) Acrylic acid/2-AMPS copolymer in a molar ratio of 75/25
(H) Copolymer of dimethyl diallyl ammonium chloride in a weight ratio of about 75/25
(I) 49/51 mole ratio copolymer of acrylamide and 2-AMPS, the acrylamide portion hydrolyzed to 17%
(J) 49/51 mole ratio copolymer of acrylamide and 2-AMPS, the acrylamide portion hydrolyzed to 34%
(K) 49/51 mole ratio copolymer of acrylamide and 2-AMPS, the acrylamide portion hydrolyzed to 100%
(L) 49/51 mole ratio copolymer of acrylamide and 2-AMPS, including a borax buffer and 20% $Na_2SO_4$
(M) 49/51 mole ratio copolymer of acrylamide and 2-AMPS, including 20% $Na_2SO_4$
(N) Potassium metaphosphate, 30% solution (C 55)

The tests were run by dividing the actual samples into twenty-five milliliter test tubes and adding the quantities of silt-control composition shown, with the relative performance indicated.

Example 1

From an open recirculating cooling tower in New York

Analysis:
  Major: Calcium carbonate (calcite)
  High minor: Hydrated ferric oxide
  Low minor: Silica (quartz and diatoms)
  Trace: Magnetic iron oxide; calcium magnesium carbonate (dolomite)

Relative effectiveness (best performance = 1)
(1) K at 1 p.p.m.
(2) I at 1 p.p.m.
(3) J at 1 p.p.m.
(4) L at 1 p.p.m.
(5) D at 4 p.p.m.
(6) C at 4 p.p.m.
(7) H at 6 p.p.m.
(8) M at 1 p.p.m.
(9) A at 1 p.p.m.
(10) Control Example 2

From a once-through system in Ohio

Analysis:
  Major: Aluminum silicate (illite); hydrated ferric oxide
  Low minor: Ferric oxide (hematite)
  Trace: Magnetic iron oxide; silica (quartz)

Relative effectiveness (best performance = 1)
(1) B at 1 p.p.m.
(2) K at 1 p.p.m.
(3) F at 2 p.p.m.
(4) A at 1 p.p.m.
(5) H at 7 p.p.m.
(6) J at 1 p.p.m.
(7) I at 1 p.p.m.
(8) G at 2 p.p.m.
(9) D at 4 p.p.m.
(10) N at 4 p.p.m.
(11) Control Example 3

From a once-through system in the State of Washington

Analysis:
  Major: Aluminum silicate (feldspar and slight kaolinites); silica (quartz and diatoms)
  High minor: Hydrated ferric oxide
  Trace: Magnetic iron oxide; magnesium carbonate; ferric oxide Relative effectiveness (best performance = 1)
(1) K at 1 p.p.m.
(2) I at 1 p.p.m.
(3) J at 1 p.p.m.
(4) H at 7 p.p.m.
(5) D at 4 p.p.m.
(6) E at 1 p.p.m.
(7) A at 1 p.p.m.
(8) Control

Example 4

From an open recirculating system in Ohio

Analysis:

Analysis:
  Major: Aluminum silicate (illite and traces feldspar)
  High minor: Silicon (quartz and diatoms)
  Low minor: Hydrated ferric oxide
  Trace: Calcium carbonate (calcite); magnetic iron oxide; ferric oxide (hematite); fly ash; sulfur; aluminum oxide Relative effectiveness (best performance=1)
  (1) K at 1 p.p.m.
  (2) F at 1 p.p.m.
  (3) L at 1 p.p.m.
  (4) A at 1 p.p.m.
  (5) H at 7 p.p.m.
  (6) D at 4 p.p.m.
  (7) E at 1 p.p.m.
  (8) Control Our polymers may be used in quantities as little as 0.05 p.p.m. We know of no lower limit beyond which they are absolutely ineffective; a very small amount is effective to a small degree. Although a practical limit will be reached at a maximum of about 20 p.p.m., there is no reason why more, i.e., up to 200 p.p.m., cannot be used. Our preferred range is about 1 to about 5 p.p.m.

This invention relates to methods of prevention, control and removal of alluvium in aqueous systems through the use of the polymers described above. The polymers are added in dried or dissolved form to the water to be treated, and circulated into and through the system in contact with the alluvium and silt, which may be suspended or already deposited. The silt or alluvium thereby forms a light floc and is flushed out of the system. For best results, the polymer should be added continuously or periodically.

We do not intend to be limited in any way to the specific examples and illustrations above; our invention may be otherwise variously practiced within the scope of the following claims.

We claim:
1. Method of controlling the deposition of alluvium and silt in a water system comprising adding thereto at least 0.05 p.p.m. of a water-soluble polymer containing a monomer of the formula

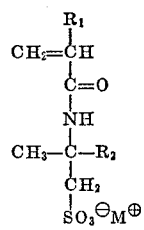

where $R_1$ is H, alkyl to $C_4$ (linear or branched), phenyl and substituted phenyl, and where $R_2$ is H, phenyl, substituted phenyl, alkyl (linear or branched) or cycloalkyl to $C_{12}$ and where M is H, alkali metal, alkaline metals, zinc or copper, and $N(R_3)_4$ where $R_3$ is H, alkyl (linear or branched), cycloalkyl, benzyl, phenyl and hydroxy alkyl (linear or branched), and circulating it through the system in contact with the alluvium and silt.

2. Method of claim 1 in which the polymer contains at least 2 mole percent 2-acrylamido propane sulfonic acid.

3. Method of claim 1 in which the polymer used is a homopolymer of 2-acrylamido propane sulfonic acid or its salts.

4. Method of claim 1 in which the polymer is a copolymer of a 2-acrylamido propane sulfonate and a water-soluble monomer.

5. Method of controlling the deposition of alluvium and silt in a water system comprising adding thereto at least about 0.05 p.p.m. of a copolymer of acrylamide and a 2-acrylamido propane sulfonate.

6. Method of claim 5 in which the acrylamide portion of the polymer is at least partially hydrolyzed.

References Cited

UNITED STATES PATENTS 3,085,916  4/1963  Zimmie et al. _____ 134—22
3,506,707  4/1970  Miller et al. _____ 260—79.3

MICHAEL ROGERS, Primary Examiner

U.S. Cl. X.R.

134—22; 252—180